(12) United States Patent
Op De Beeck

(10) Patent No.: US 12,377,818 B2
(45) Date of Patent: Aug. 5, 2025

(54) CLEANING DEVICE AND METHOD ON BOARD OF A VEHICLE

(71) Applicant: Plastic Omnium Advanced Innovation and Research, Brussels (BE)

(72) Inventor: Joel Op De Beeck, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 18/714,309

(22) PCT Filed: Dec. 8, 2022

(86) PCT No.: PCT/EP2022/085074
§ 371 (c)(1),
(2) Date: May 29, 2024

(87) PCT Pub. No.: WO2023/105007
PCT Pub. Date: Jun. 15, 2023

(65) Prior Publication Data
US 2025/0018901 A1 Jan. 16, 2025

(30) Foreign Application Priority Data
Dec. 9, 2021 (LU) .......................... 500971

(51) Int. Cl.
*B60S 1/56* (2006.01)
*B60S 1/50* (2006.01)
(Continued)

(52) U.S. Cl.
CPC . *B60S 1/56* (2013.01); *B60S 1/50* (2013.01); *B60S 1/52* (2013.01); *B60S 1/54* (2013.01)

(58) Field of Classification Search
None
See application file for complete search history.

(56) References Cited

U.S. PATENT DOCUMENTS

2007/0284457 A1* 12/2007 Shank .................... B05B 9/002
239/135
2008/0238143 A1* 10/2008 Geyrhofer ................ B60S 1/50
296/187.03

(Continued)

FOREIGN PATENT DOCUMENTS

CN 109720298 A 5/2019
CN 112172744 A 1/2021

(Continued)

OTHER PUBLICATIONS

International Search Report Issued Mar. 22, 2023 in PCT/EP2022/085074, filed on Dec. 8, 2022, 3 pages.

*Primary Examiner* — Omair Chaudhri
(74) *Attorney, Agent, or Firm* — Oblon, McClelland, Maier & Neustadt, L.L.P.

(57) ABSTRACT

A cleaning device on-board of a vehicle, the cleaning device being configured for cleaning a surface of the vehicle, the cleaning device including: a tank configured for containing a gas and a washing liquid, the tank including a gas feed line, a washing liquid feed line, a washing liquid filling opening and a gas filling opening, a gas outlet port and a washing liquid outlet port, a gas pressurizing device fluidly connected to the gas filling opening and configured to pressurize the tank, a first nozzle configured to spray the washing liquid and/or to blow the gas, the first nozzle being fluidly connected to the gas feed line and/or the washing liquid feed line and a first valve fluidly connected to the first nozzle.

15 Claims, 6 Drawing Sheets

(51) Int. Cl.
*B60S 1/52* (2006.01)
*B60S 1/54* (2006.01)

(56) References Cited

U.S. PATENT DOCUMENTS

| | | | |
|---|---|---|---|
| 2015/0183406 A1* | 7/2015 | Tanaka | B05B 7/0815 |
| | | | 134/99.1 |
| 2019/0031155 A1* | 1/2019 | Mizuno | B08B 3/08 |
| 2019/0314865 A1* | 10/2019 | Sevak | G02B 27/0006 |
| 2022/0017047 A1 | 1/2022 | Gulde et al. | |
| 2022/0306047 A1* | 9/2022 | Krishnan | B60S 1/56 |
| 2022/0397081 A1* | 12/2022 | Hanisch | F02M 25/0227 |
| 2023/0173521 A1* | 6/2023 | Baudouin | F16K 11/22 |
| | | | 239/124 |

FOREIGN PATENT DOCUMENTS

| | | |
|---|---|---|
| DE | 10 2019 125 970 A1 | 4/2021 |
| WO | WO-2022033927 A1 * | 2/2022 |

\* cited by examiner

CLEANING DEVICE AND METHOD ON BOARD OF A VEHICLE

FIELD OF THE INVENTION

The present invention relates to a cleaning device on board of a vehicle, said cleaning device being configured for cleaning a surface of a vehicle, particularly for cleaning a sensor surface of a vehicle. The invention related also to a vehicle comprising a cleaning device and to a method for cleaning a surface of a vehicle.

BACKGROUND OF THE INVENTION

Vehicles have been required to grasp or recognize the circumstances of their own surroundings. As a result, many vehicles have come to have on-board cameras or vehicle sensors such as Light Detection and Ranging (LiDAR) sensors surface mounted on the vehicle. The vehicle may include sensors such as Light Detection and Ranging (LiDAR) sensors configured to detect an object and a terrain around the vehicle or cameras, which shoot or make a video of images of their surroundings.

A vehicle sensor is defined as an element of detection providing an electrical signal proportional to a physical quantity to be measured. More precisely, this sensor is intended to perform functions of detection around the vehicle. For this, such a sensor is typically placed on the body of the vehicle and is turned towards the outside of the vehicle. A Light Detection and Ranging (LIDAR) sensor is a sensor that can detect the distance, direction, speed, temperature, material distribution and concentration characteristics to objects by irradiating a laser to a target. The LiDAR sensor generally utilizes the advantage of the laser that can generate pulse signals with high energy density and short periods, and is used for more precise observation of the physical properties of the atmosphere and distance measurement.

Unfortunately, the on-board cameras and/or sensors such as LiDAR sensors may suffer from foreign matters, such as dirt or liquid drops, which are deposited on their surfaces. Therefore, it is required to clean said surfaces in order to preserve their performances.

Cleaning devices have been developed in order to remove foreign matters of the surfaces of the cameras and/or the sensors on-board of a vehicle. German Patent Application DE102019125970 A1 discloses for example a complex device comprising a gas tank and a washing liquid tank. The document US20190136891 discloses a pressurised tank containing a washing liquid and a gas, nevertheless the cleaning device described is limited to spraying a washing liquid in a first step followed by the blowing of compressed air in a second step. The document CN112172744 A discloses a cleaning device according to the preamble of claim 1.

Furthermore, the methods at present used for cleaning a surface of a vehicle, more precisely to clean surfaces of cameras or sensors such as Light Detection and Ranging (LiDAR) sensors on board of vehicles are very tedious and not adapted to specific needs linked to the nature of the contaminants or the weather conditions.

SUMMARY OF THE INVENTION

It is an object of the present invention to provide good devices and methods for cleaning surfaces of vehicles, more particularly surfaces of cameras or sensors such as Light Detection and Ranging (LiDAR) sensors on board of vehicles.

It is another object of the present invention to provide a cleaning device on board of vehicles, which is less complex and cheaper than the existing ones.

It is also an object of the present invention to provide a cleaning method of surfaces of vehicles, more particularly surfaces of cameras or sensors such as Light Detection and Ranging (LiDAR) sensors on board of vehicles, which is flexible and adapted to specific needs for removing foreign matters.

According to a first embodiment of the present disclosure, these objectives are achieved with a cleaning device on-board of a vehicle, the cleaning device being configured for cleaning a surface of the vehicle, said cleaning device comprising:
  a tank configured for containing a gas and a washing liquid, the tank comprising a gas feed line, a washing liquid feed line, a washing liquid filling opening and a gas filling opening, a gas outlet port and a washing liquid outlet port,
  a gas pressurizing means fluidly connected to the gas filling opening and configured to pressurize the tank,
  a first nozzle configured to spray the washing liquid and/or to blow the gas, the first nozzle being fluidly connected to the gas feed line and/or the washing liquid feed line,
  a first valve fluidly connected to the first nozzle,
wherein the gas pressurizing means is located totally or partly in a gas volume of the tank.

By using a tank configured for containing a gas and a washing liquid, said tank being pressurized with a gas pressuring means, it is possible to supply to the first nozzle either a compressed gas or a pressurized washing liquid or both through the gas feed line or the washing feed line or both. Moreover, the cleaning device according to the invention does not require any washing liquid pressurizing pump and is thus less complex and cheaper than the existing ones.

The gas pressurizing means is located totally or partly in a gas volume of the tank, such as the gas dome. The total or partial location of the gas pressurizing means in the gas volume gives the gas pressurizing means direct access to the gas. With this arrangement, the gas pressurizing means can be kept dry and therefore can be made from simpler materials and with a simpler design.

By the expression "gas feed line" is meant the line connecting the gas outlet port to at least the first nozzle.

By the expression "washing liquid feed line" is meant the line connecting the washing liquid outlet port to at least the first nozzle.

By the expression "a first nozzle configured to spray the washing liquid and/or to blow the gas" is meant that the first nozzle is configured to selectively either spray the washing liquid or blow the gas, or both spray the washing liquid and blow the gas.

By the expression "the first nozzle being fluidly connected to the gas feed line and/or the washing liquid feed line" is meant that the first nozzle is fluidly connected to either the gas feed line (when the first nozzle is configured to blow the gas) or the washing liquid feed line (when the first nozzle is configured to spray the washing liquid), or both the gas feed line and the washing liquid feed line (when the first nozzle is configured to both blow the gas and spray the washing liquid).

By the expression "the gas pressurizing means is located totally in a gas volume of the tank" is meant that the gas pressurizing means is entirely located in a gas volume of the tank.

By the expression "the gas pressurizing means is located partly in a gas volume of the tank" is meant that the gas pressurizing means is located both in a gas volume of the tank and outside the tank. In this case, the gas pressurizing means passes through a wall of the tank.

By the expression "in a gas volume of the tank" is meant a volume of the tank containing the gas.

By the expression "gas dome" is meant the upper part of the tank relative to the washing liquid surface.

The washing liquid filling opening and the gas filling opening are closable openings in order to ensure the pressurization of the tank. The washing liquid filling opening and the gas filling opening may be the same opening or two separate openings, The first valve is located upstream based on the fluid flowing direction relative to the first nozzle on the gas feed line or on the washing liquid feed line or on both. The gas outlet port is preferably located in the volume of the tank containing the gas and the washing liquid outlet port is preferably located in the volume of the tank containing the washing liquid. The gas outlet port can be placed in the tank wall on the top of the tank, the top of the tank being defined as a side or top wall of the tank in contact with the gas in the tank. The gas outlet port can be placed preferably in the tank top centre to protect it from washing liquid movement such as waves in the tank. The washing liquid outlet port can be placed in the tank wall on the bottom of the tank, the bottom of the tank being defined as a side or bottom wall of the tank in contact with the washing liquid in the tank. Preferably, the cleaning device on-board of a vehicle is such that the tank comprises a washing liquid bowl located in the washing liquid volume upstream of the washing liquid outlet port. The washing liquid outlet port is thus located in a so-called liquid trap (bowl), which consists of a separate volume in the tank bottom, which is filled when the tank is in horizontal position or in an inclination, which at least partially submerges the bowl. This bowl however prevents washing liquid from escaping under various tank inclinations and/or washing liquid movements. The gas is preferably air and the washing liquid is preferably a water-based solution, more preferably a water solution containing an alcohol such as ethylene glycol.

According to a preferred embodiment, the cleaning device on-board of a vehicle is such that the tank comprises an overpressure valve. The overpressure valve permits to avoid an important mechanical stress on the tank due to its pressurization by the gas pressurizing means. The overpressure valve permits also to avoid the use of sophisticated control/diagnostics/sensors. The overpressure valve is preferably located in the volume of the tank containing the gas. Said location of the overpressure valve permits to avoid the loss of washing liquid.

According to a preferred embodiment, the cleaning device on-board of a vehicle is such that the gas pressurizing means is affixed on a wall of the tank. A gas pressuring means affixed on a wall of the tank permits to reduce the number of gas lines because there is no more need for a compressor outlet gas line and a gas tank inlet line. This permits to simplify significantly the architecture of the cleaning device and to reduce the cost of said cleaning device.

The expression "the gas pressurizing means is affixed on a wall of the tank" has the same meaning than the expression "the gas pressurizing means is affixed in a leak tight manner on a wall of the tank".

According to a preferred embodiment, the cleaning device on-board of a vehicle is such that the gas pressurizing means is selected from the group consisting of a compressor and a gas pump. Preferably, the gas pressurizing means is a compressor. Gas pumps are more focused on high flow rates (and low pressure), whereas compressors are focused on compressing air (at high pressure) with or without any flow rate. Moreover, compressors are the simplest and lowest cost solutions for high pressures.

According to a preferred embodiment, the cleaning device on-board of a vehicle is such that it comprises a second nozzle configured to spray the washing liquid and/or to blow the gas and said second nozzle is fluidly connected to the gas feed line and/or to the washing liquid feed line and to a second valve. It is thus possible to supply to the second nozzle either a compressed gas or a pressurized washing liquid or both through the gas feed line or the washing feed line or both. The second valve is located upstream based on the fluid flowing direction relative to the second nozzle on the gas feed line or on the washing liquid feed line or on both. The use of a second nozzle permits to have a cleaning device offering a maximum of performances and a better flexibility. It is possible to use the nozzles independently from each other to spray the washing liquid or to blow the gas on the surface of the vehicle to be cleaned.

The first nozzle can be located at a remote position of the gas feed line and/or the washing liquid feed line from the first valve. The second nozzle can also be located at a remote position of the gas feed line and/or the washing liquid feed line from the second valve. In a further embodiment, the gas feed line and/or the washing liquid feed line can include a manifold holding various valves. These valves are then fluidly connected with individual nozzles at remote locations close to the surface of the vehicle to be cleaned.

According to a preferred embodiment, the cleaning device on-board of a vehicle is such that the first nozzle is configured to spray an aerosol comprising the washing liquid and the gas or to spray the washing liquid or to blow the gas and the first nozzle being fluidly connected to the gas feed line and to the washing liquid feed line. Both the gas and the washing liquid can be sprayed from a single nozzle. This nozzle can be positioned in an optimal location and does not require a secondary nozzle on the same sensor.

According to a preferred embodiment, the cleaning device on-board of a vehicle is such that the tank comprises a liquid gas separator located in the gas volume upstream of the gas outlet port. A liquid gas separator assures that no liquid can leave the tank through the gas outlet. This assures a complete washing liquid free gas flow through the gas feed line, valve and nozzle, which assures a better control and better gas jet quality for the blowing.

By the expression "a liquid gas separator located in the gas volume upstream of the gas outlet port" is meant that the liquid gas separator is located upstream based on the fluid flowing direction relative to the gas outlet port, said liquid gas separator being also located in the gas volume of the tank.

According to a preferred embodiment, the cleaning device on-board of a vehicle is such that the first valve is a solenoid-actuated valve. A solenoid-actuated valve can be electrically actuated upon demand. Optimal cleaning strategies can thus be set-up and calibrated. The use of an Electronic Control Unit (ECU) with the solenoid-actuated valve assures the faultless execution.

According to a preferred embodiment, the cleaning device on-board of a vehicle is such that the second valve is a solenoid-actuated valve. When the second valve is also a solenoid-actuated valve, then the second valve, which could be used for spraying a washing liquid or blowing a gas, can be controlled independently from the first valve. This assures better flexibility for optimal cleaning performance.

According to a preferred embodiment, the cleaning device on-board of a vehicle is such that the tank comprises a level sensor. A level sensor in the tank allows to detect the actual washing liquid level in the tank at any time. This allows informing the driver and service station about the level in the tank, and to be warned of the remaining autonomy of the cleaning device, which allows a pro-active refilling before depletion.

According to a preferred embodiment, the cleaning device on-board of a vehicle is such that the tank comprises a pressure sensor. A pressure sensor assures a detection of tank internal pressure at any time. It can be used to operate the compressor when the tank internal pressure is below a certain pressure threshold. It can also be used to stop the compressor when the tank internal pressure is above a maximal threshold. It can also be used to diagnose the correct operation of the compressor and overall correct operation of the cleaning device.

According to a preferred embodiment, the cleaning device on-board of a vehicle is such that the tank comprises a temperature sensor. A temperature sensor can be used to detect the risk of washing liquid freezing. It also allows a better knowledge of the pressure/temperature evolution in the tank of the cleaning device, which improves the cleaning device control and diagnostics.

According to a preferred embodiment, the cleaning device on-board of a vehicle is such that the tank comprises at least one sensor device selected from the group consisting of a level sensor, a pressure sensor, a temperature sensor and a combination thereof.

According to a preferred embodiment, the cleaning device on-board of a vehicle is such that a valve is located on a line connecting the gas feed line to the washing liquid feed line. This valve allows to connect the gas feed line with the washing liquid feed line. By opening this valve, a mixture of gas/washing liquid can be formed, which increases the volumetric flow rate through the nozzle of the cleaning device and therefore the washing/cleaning power of the nozzle. It also allows gas bubbles to be left in the first nozzle when the first nozzle freezes so that the freezing washing liquid expands freely in the gas bubbles.

An object of the present invention is also to provide a vehicle comprising a cleaning device according to the invention, said cleaning device being configured for cleaning a surface of said vehicle. Controlling the nozzle of the cleaning device on a surface allows to direct all cleaning power on a specific location on the vehicle. This surface can therefore be removed of any solid and/or liquid foreign matter, such as water drops, ice, mud, dust, salts, bird drops or insects.

According to a preferred embodiment, the vehicle is such that the surface of the vehicle is a sensor surface or a camera surface. When the surface is part of a sensor for example, then the correct operation of the sensor can be restored by removing any foreign matter from its surface that alters its signal. The sensor may be a LIDAR sensor, an ultrasound sensor and/or a radar sensor. The camera could be an infrared camera or a camera for visual images. Some of these sensors or cameras can be placed behind a transparent vehicle surface, the latter being washed by the cleaning device.

By the expression "camera surface" is meant the surface of the optics of the camera or the surface protecting said optics.

Another object of the present invention is to provide a tank for a cleaning device on-board of a vehicle, said tank being configured for containing a gas and a washing liquid and for being pressurized, the tank comprising a gas feed line, a washing liquid feed line, a washing liquid filling opening and a gas filling opening configured to be connected to a gas pressuring means, a gas outlet port and a washing liquid outlet port.

Another object of the present invention is to provide a method for cleaning a surface of a vehicle, said method comprising the following steps:
  pressurizing a tank containing a gas and a washing liquid by compressing said gas,
  opening a first valve located on a washing liquid feed line fluidly connected to the tank or opening a second valve located on a gas feed line fluidly connected to the tank,
  spraying the washing liquid on the surface or blowing the gas onto the surface.

A single step of blowing a gas permits for example to dry the surface during or after a rain period or to avoid foreign matters due to collisions with insects.

Another object of the present invention is to provide a method for washing a surface of a vehicle comprising the following, preferentially successive, steps:
  pressurizing a tank containing a gas and a washing liquid by compressing said gas using pressuring means located totally or partly in a gas volume of the tank,
  opening a first valve located on a washing liquid feed line fluidly connected to the tank,
  spraying the washing liquid on the surface,
  opening a second valve located on a gas feed line fluidly connected to the tank,
  blowing the gas onto the surface.

The described sequence allows a liquid washing of the surface to remove foreign matters from the surface, followed by a gas blowing to dry the surface.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION OF THE PREFERRED EMBODIMENTS

Figure 1:
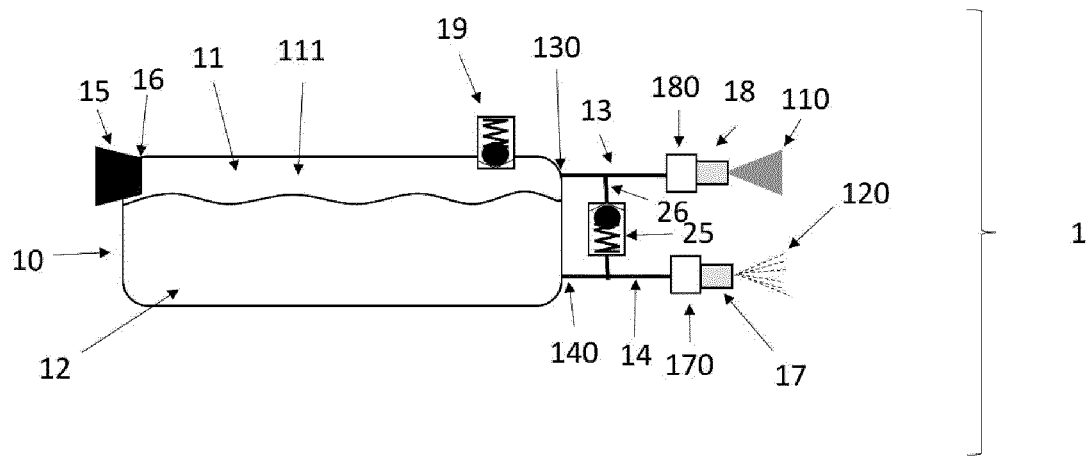
FIG. 1 is a vertical cross-section of a first embodiment of a cleaning device on-board of a vehicle according to the invention.

In the different figures, the same reference signs refer to the same or analogous elements.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter, it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The following terms are provided solely to aid in the understanding of the invention.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

FIG. 1 presents a vertical cross-section of a first embodiment of a cleaning device 1 on-board of a vehicle according to the invention. Said cleaning device 1 is configured for cleaning a surface of the vehicle, such as a surface sensor or a camera surface. The cleaning device 1 comprises a tank 10 configured for containing a gas 11 and a washing liquid 12, the tank comprising a gas feed line 13, a washing liquid feed line 14, a washing liquid filling opening (not shown) and a gas filling opening 16, a gas outlet port 130 and a washing liquid outlet port 140. The tank 10 comprises also an overpressure valve 19. The cleaning device 1 comprises a gas pressurizing means 15 fluidly connected to the gas filling opening 16 and affixed on a wall of the tank 10. Said gas pressurizing means 15 is configured to pressurize the tank 10 at a pressure around 3 to 10 bars, preferably around 5 to 10 bars. Said gas pressurizing means 15 is preferably a compressor 15 located partly in the gas volume 111 of the tank 10 and it pressurizes the tank at a pressure around 3 to 10 bars, preferably at a pressure around 5 to 10 bars. The cleaning device comprises also a first nozzle 17 configured to spray the washing liquid 12 to form a sprayed washing liquid 120, the first nozzle 17 being fluidly connected to the washing liquid feed line 14. The spray of the washing liquid is controlled with a first valve 170 fluidly connected to the first nozzle 17. The cleaning device 1 comprises also a second nozzle 18 configured to blow the gas 11 to form a blown gas 110 and said second nozzle 18 is fluidly connected to the gas feed line 13. The blowing of the gas is controlled with a second valve 180. A line 26 connects the gas feed line 13 to the washing liquid feed line 14 through a valve 25 located on said line 26. This additional line 26 permits by opening the valve 25 to connect the gas feed line 13 to the washing liquid feed line 14 and to spray a mixture of gas/washing liquid through the first nozzle 17. The cleaning device according to the invention permits to spray a washing liquid or to blow a gas on the surface to clean within 20 to 50 ms.

Figure 2:
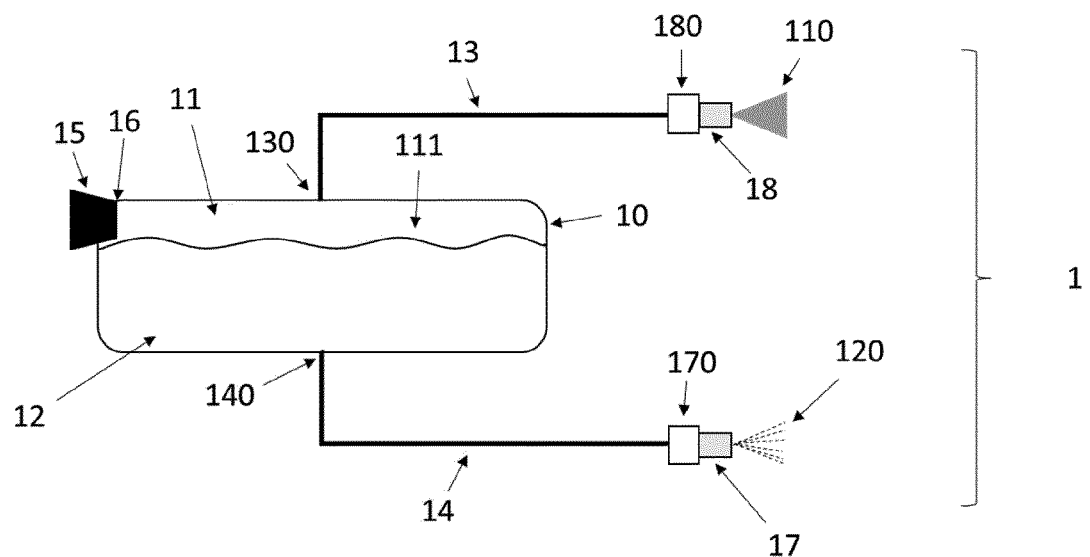
FIG. 2 is a vertical cross-section of a second embodiment of a cleaning device on-board of a vehicle according to the invention.

FIG. 2 presents a vertical cross-section of a second embodiment of a cleaning device 1 on-board of a vehicle according to the invention. Said cleaning device 1 is configured for cleaning a surface of the vehicle, such as a surface sensor or a camera surface. The cleaning device 1 comprises a tank 10 configured for containing a gas 11 and a washing liquid 12, the tank comprising a gas feed line 13, a washing liquid feed line 14, a washing liquid filling opening (not shown) and a gas filling opening 16, a gas outlet port 130 and a washing liquid outlet port 140. The cleaning device 1 comprises a gas pressurizing means 15 fluidly connected to the gas filling opening 16 and affixed on a wall of the tank 10. Said gas pressurizing means 15 is configured to pressurize the tank 10 at a pressure around 3 to 10 bars, preferably around 5 to 10 bars, said gas pressurizing means 15 is preferably a compressor 15 located partly in the gas volume 111 of the tank 10 and it pressurizes the tank at a pressure around 3 to 10 bars, preferably around 5 to 10 bars. The cleaning device comprises also a first nozzle 17 configured to spray the washing liquid 12 to form a sprayed washing liquid 120, the first nozzle 17 being fluidly connected to the washing liquid feed line 14, The spray of the washing liquid is controlled with a first valve 170 fluidly connected to the first nozzle 17. The cleaning device comprises also a second nozzle 18 configured to blow the gas 11 to form a blown gas 110 and said second nozzle 18 is fluidly connected to the gas feed line 13. The blowing of the gas is controlled with a second valve 180. The cleaning device according to the invention permits to spray a washing liquid or to blow a gas on the surface to clean within 20 to 50 ms.

Figure 3:
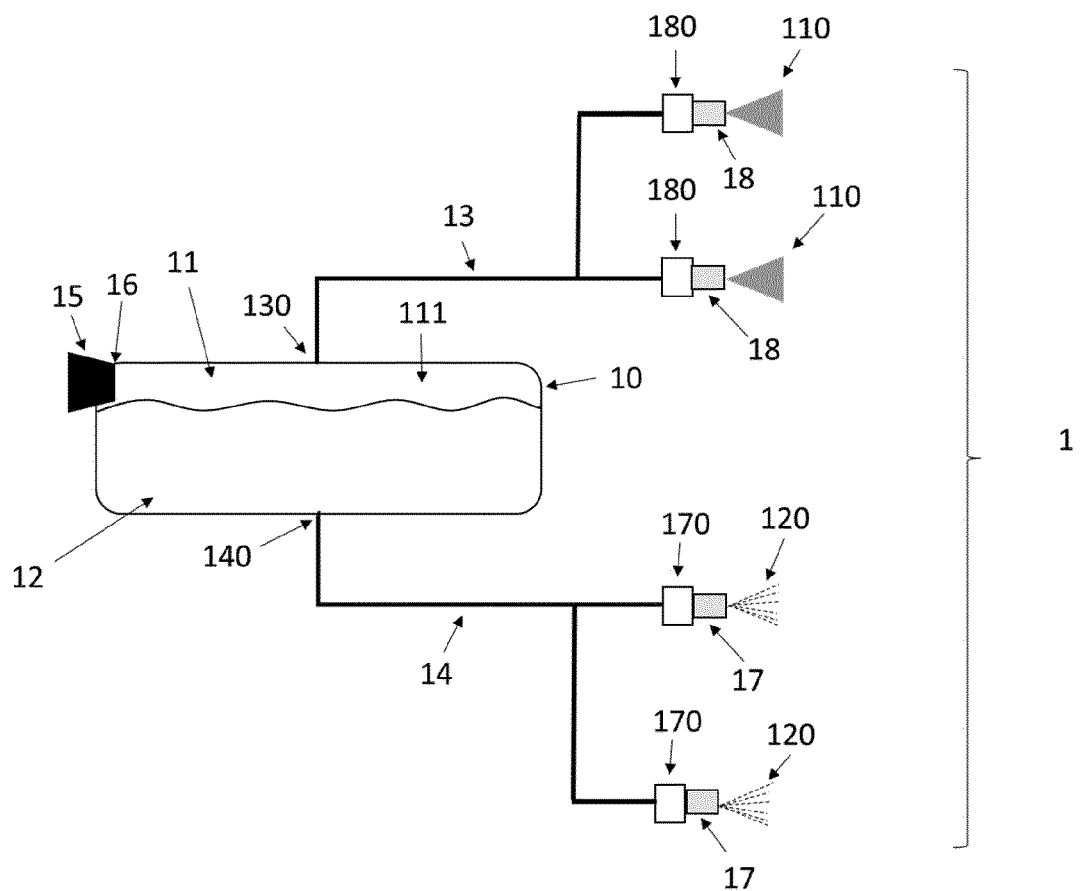
FIG. 3 is a vertical cross-section of a third embodiment of a cleaning device on-board of a vehicle according to the invention.

FIG. 3 presents a vertical cross-section of a third embodiment of a cleaning device 1 on-board of a vehicle according to the invention. Said third embodiment is an evolution of the second embodiment presented on FIG. 2 but comprising two first nozzles 17 and two second nozzles 18.

Figure 4:
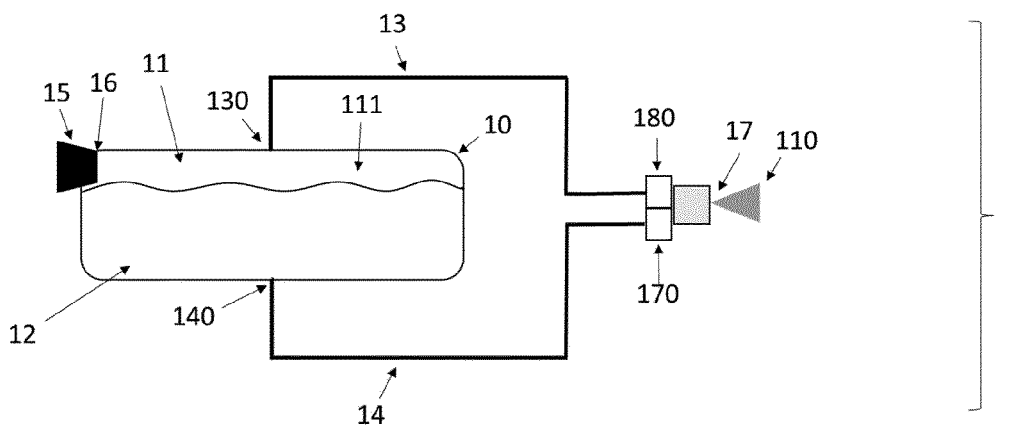
FIG. 4 is a vertical cross-section of a fourth embodiment of a cleaning device on-board of a vehicle according to the invention.

FIG. 4 presents a vertical cross-section of a fourth embodiment of a cleaning device 1 on-board of a vehicle according to the invention. Said cleaning device 1 is configured for cleaning a surface of the vehicle, such as a surface sensor or a camera surface. The cleaning device 1 comprises a tank 10 configured for containing a gas 11 and a washing liquid 12, the tank 10 comprising a gas feed line 13, a washing liquid feed line 14, a washing liquid filling opening (not shown) and a gas filling opening 16, a gas outlet port 130 and a washing liquid outlet port 140. The cleaning device 1 comprises a gas pressurizing means 15 fluidly connected to the gas filling opening 16 and affixed on a wall of the tank 10. Said gas pressurizing means 15 is configured to pressurize the tank 10 at a pressure around 3 to 10 bars, preferably around 5 to 10 bars, said gas pressurizing means 15 is preferably a compressor 15 partly located in the gas volume 111 of the tank 10. The cleaning device 1 comprises also a first nozzle 17 configured to spray the washing liquid 12 or to blow the gas 11, the first nozzle 17 being fluidly connected to the washing liquid feed line 14 and to the gas feed line 13. The spray of the washing liquid is controlled with a first valve 170 fluidly connected to the first nozzle 17 and the blowing of the gas 11 is controlled by a second valve 180 fluidly connected to the first nozzle 17. The cleaning device according to the invention permits to spray a washing liquid or to blow a gas on the surface to clean within 20 to 50 ms. Such a cleaning device permits to use only one nozzle to perform the cleaning steps by blowing a gas and/or spraying a washing liquid.

Figure 5:
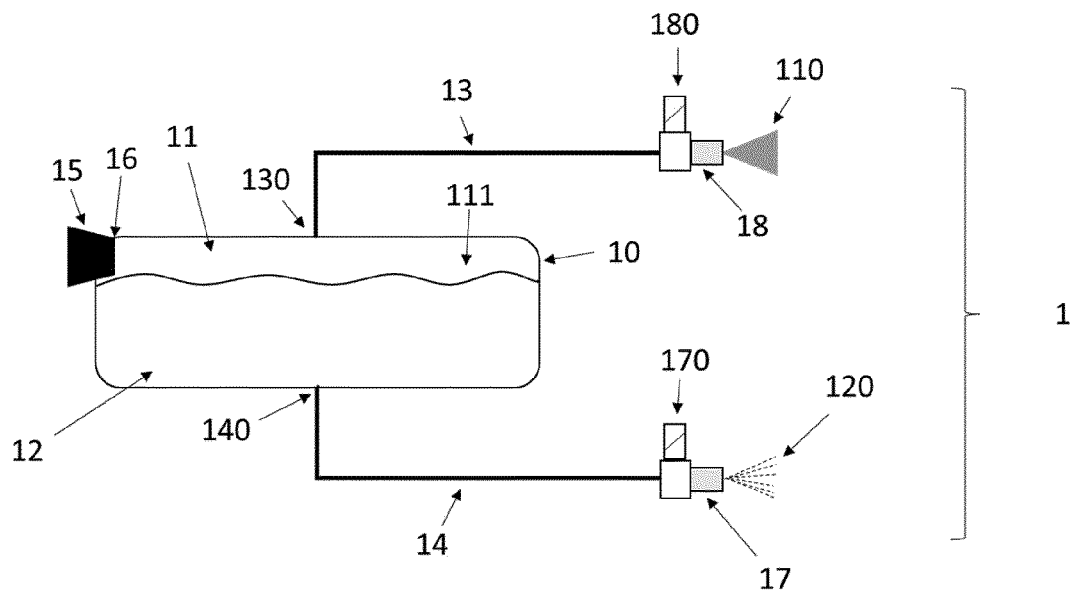
FIG. 5 is a vertical cross-section of a fifth embodiment of a cleaning device on-board of a vehicle according to the invention.

FIG. 5 presents a vertical cross-section of a fifth embodiment of a cleaning device 1 on-board of a vehicle according to the invention. Said cleaning device 1 is configured for cleaning a surface of the vehicle, such as a surface sensor or a camera surface. The cleaning device 1 comprises a tank 10 configured for containing a gas 11 and a washing liquid 12, the tank comprising a gas feed line 13, a washing liquid feed line 14, a washing liquid filling opening (not shown) and a gas filling opening 16, a gas outlet port 130 and a washing liquid outlet port 140. The cleaning device 1 comprises a gas pressurizing means 15 fluidly connected to the gas filling opening 16 and affixed on a wall of the tank 10. Said gas pressurizing means 15 is configured to pressurize the tank 10 at a pressure around 3 to 10 bars, preferably around 5 to 10 bars, said gas pressurizing means 15 is preferably a compressor 15 partly located in the gas volume 111 of the tank. The cleaning device comprise also a first nozzle 17 configured to spray the washing liquid 12 to form a sprayed washing liquid 120, the first nozzle 17 being fluidly connected to the washing liquid feed line 14, The spray of the washing liquid is controlled with a first valve 170 fluidly connected to the first nozzle 17. The cleaning device comprises also a second nozzle 18 configured to blow the gas 11 to form a blown gas 110 and said second nozzle 18 is fluidly connected to the gas feed line 13. The blowing of the gas is controlled with a second valve 180. The cleaning device according to the invention permits to spray a washing liquid or to blow a gas on the surface to clean within 20 to 50 ms. The first valve 170 and the second valve 180 are solenoid-actuated valves controlled by an electronic control unit.

Figure 6:
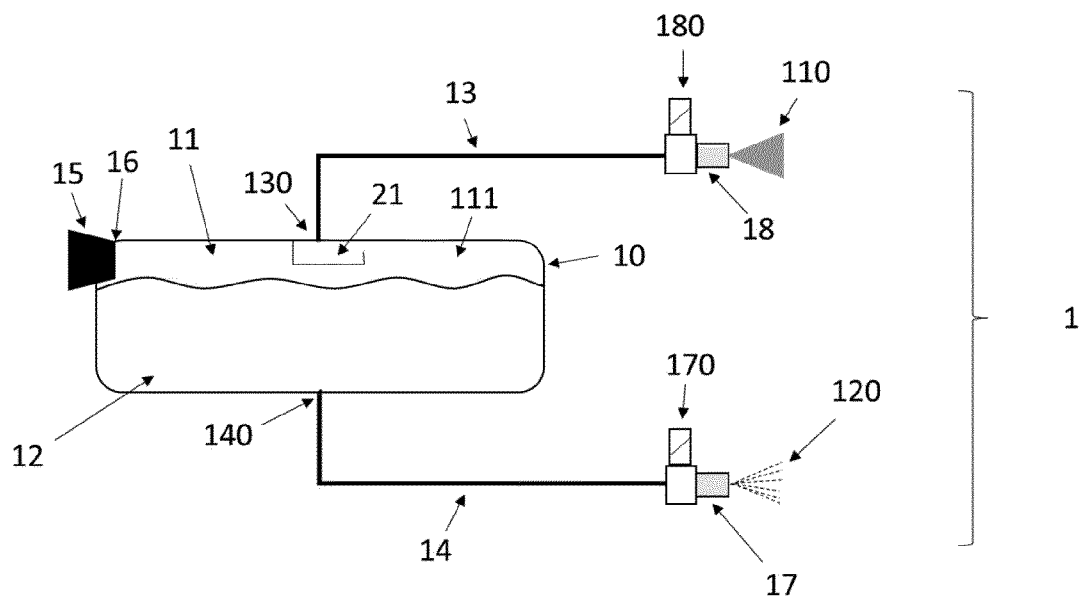
FIG. 6 is a vertical cross-section of a sixth embodiment of a cleaning device on-board of a vehicle according to the invention.

FIG. 6 presents a vertical cross-section of a sixth embodiment of a cleaning device 1 on-board of a vehicle according to the invention. Said sixth embodiment is an evolution of the fifth embodiment presented on FIG. 5, wherein a liquid gas separator 21 is located in the gas volume 111 upstream of the gas outlet port 130.

Figure 7:
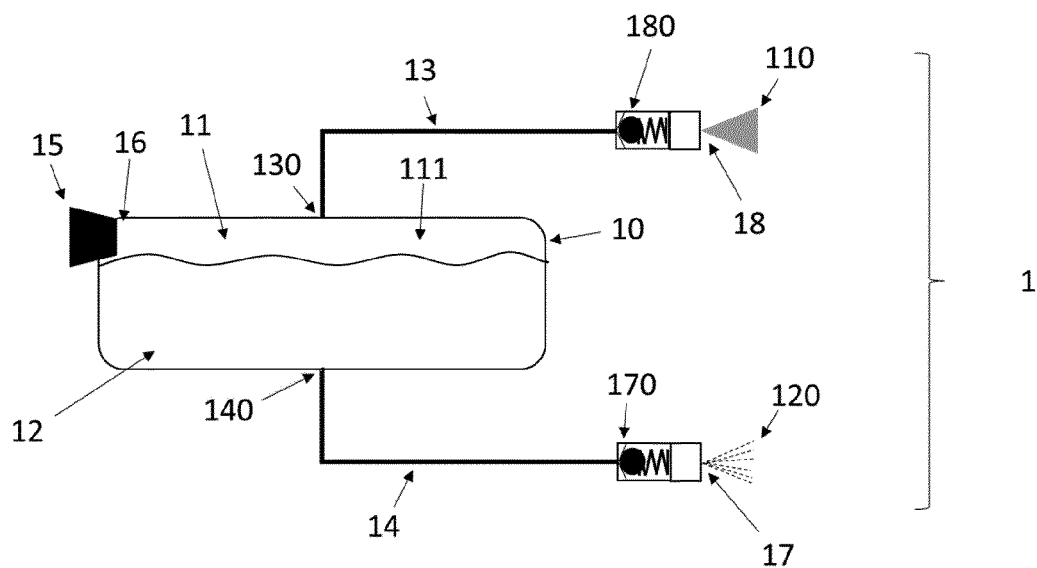
FIGS. 7, 8 and 9 are vertical cross-sections of the second embodiment of a cleaning device on-board of a vehicle according to the invention presented on FIG. 2 comprising different types of first and second valves.
Figure 8:
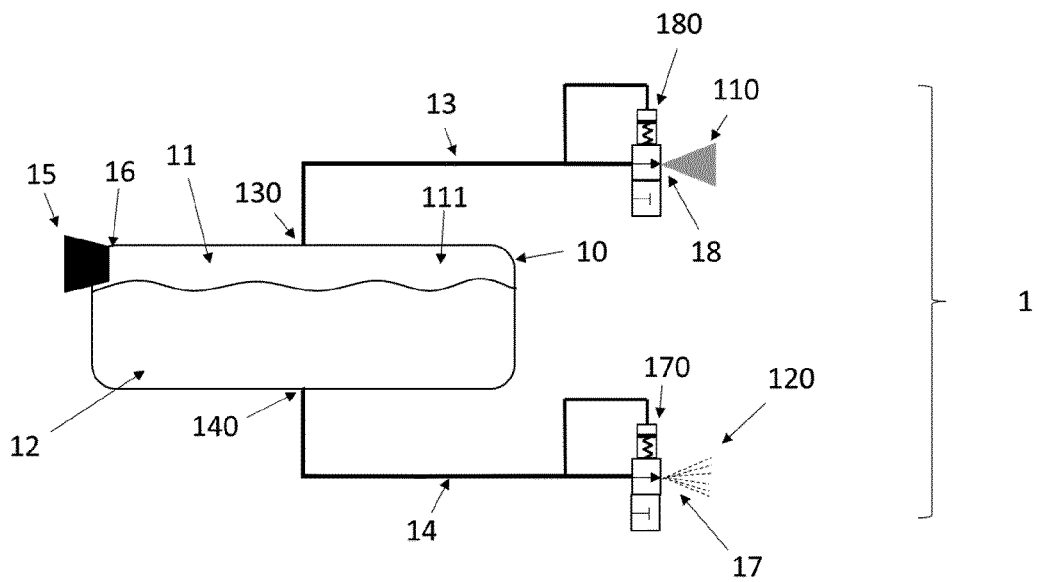
Figure 9:
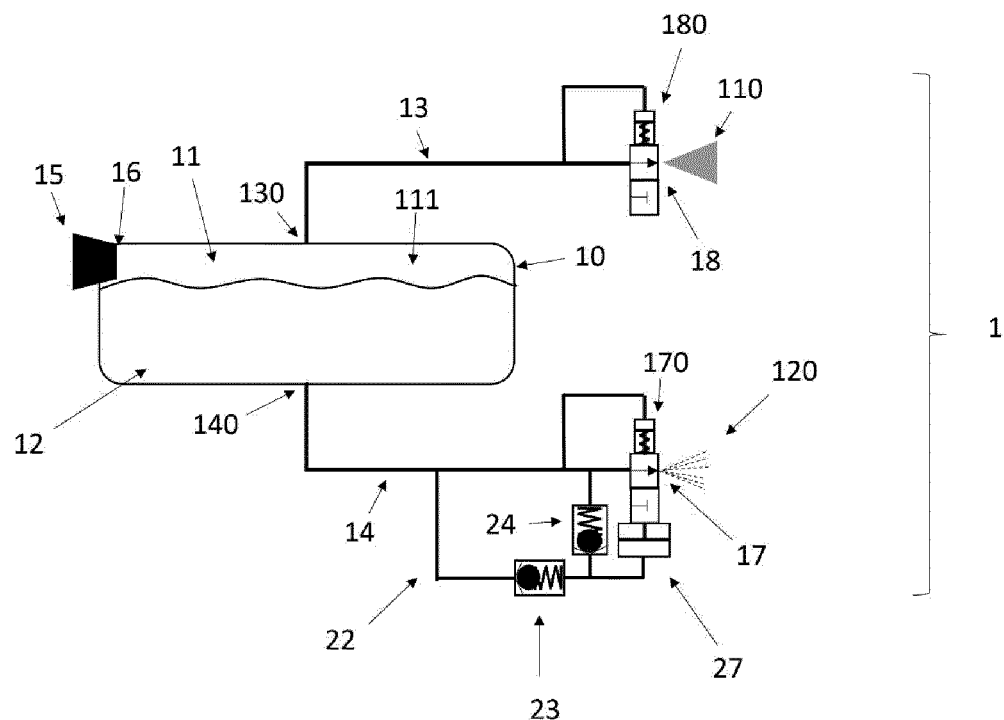

FIGS. 7, 8 and 9 present vertical cross-sections of the second embodiment of a cleaning device 1 on-board of a vehicle according to the invention. Said embodiments comprise different types of first valve 170 and second valve 180. On FIG. 7, the first valve 170 and the second valve 180 are hydraulic valves, said hydraulic valves are overpressure relief valves with an opening pressure threshold of for instance 5 bars. Said hydraulic valves are pneumatic-actuated valves when driven by a gas. These valves open therefore as soon as the pressure exceeds 5 bars. This pressure excess can be generated by powering the compressor 15 to pressurise the tank 10 at a pressure above 5 bars. FIG. 8 discloses a cleaning device 1 comprising a first valve 170 and a second valve 180, which are hydraulic valves, said hydraulic valves being pneumatic-actuated valves when driven by a gas. Finally, FIG. 9 discloses a cleaning device 1 on-board of a vehicle comprising a plurality of hydraulic valves. A first hydraulic valve 170 and a second hydraulic valve 180. The second hydraulic valve 180 is a pneumatic-actuated valve. The first hydraulic valve 170 is fluidly connected to a secondary circuit 22 fluidly connected to the washing liquid feed line 14. Said secondary circuit 22 comprising an overpressure relief valve 23, a check valve 24 and a hydraulic cylinder 27. During a cleaning cycle of the surface, the compressor 15 pressurizes the tank 10 at a pressure above 8 bars. The first hydraulic valve 170 opens at pressure above 8 bars, and the washing liquid 12 is sprayed through the first nozzle 17. During a second step, the compressor 15 pressurizes the tank 10 at a pressure above 9 bars, the overpressure relief valve 23 opens and lets the washing liquid 12 flow in the hydraulic cylinder 27. The piston in the hydraulic cylinder 27 pushes the first hydraulic valve 170 back in a closed position and the washing liquid stops to be sprayed through the first nozzle 17. The second hydraulic valve 180 opens at a pressure of 9 bars and the gas 11 is blown through the second nozzle 18. Finally, the pressure inside the tank 10 is reduced below 8 bars. The check valve 24 opens to let the pressure of the hydraulic cylinder 27 drop. The hydraulic cylinder 27 holds a compressible gas bubble (or gas) to push the washing liquid back through the check valve 24 when the tank internal pressure drops below 8 bars.

Figure 10:
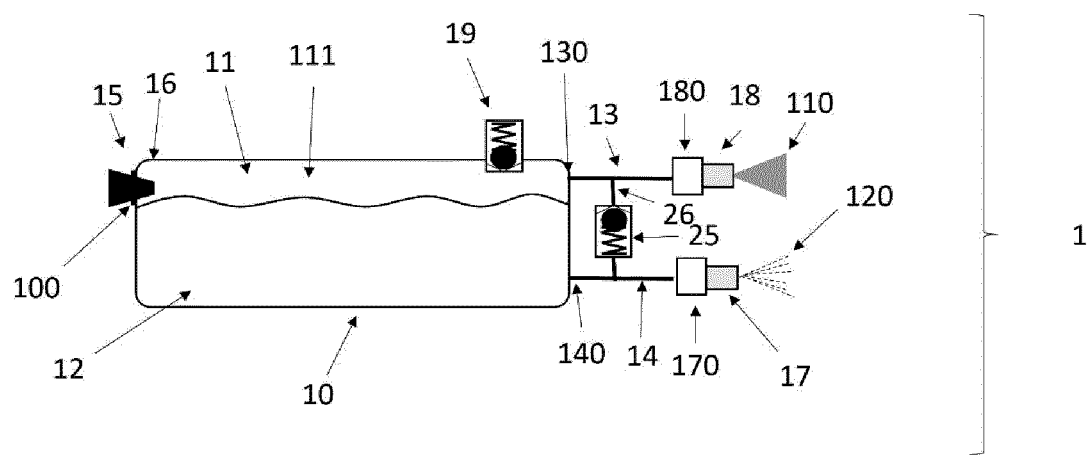
FIG. 10 is a vertical cross-section of a seventh embodiment of a cleaning device on-board of a vehicle according to the invention.

FIG. 10 presents a vertical cross-section of a seventh embodiment of a cleaning device 1 on-board of a vehicle according to the invention. Said seventh embodiment is an evolution of the first embodiment presented on FIG. 1, wherein a mounting flange 100 for the gas pressurizing means 15 is mounted within the gas filling opening 16 and the gas pressurizing means 15 is affixed on the wall of the tank 10 by means of the mounting flange 100.

Figure 11:
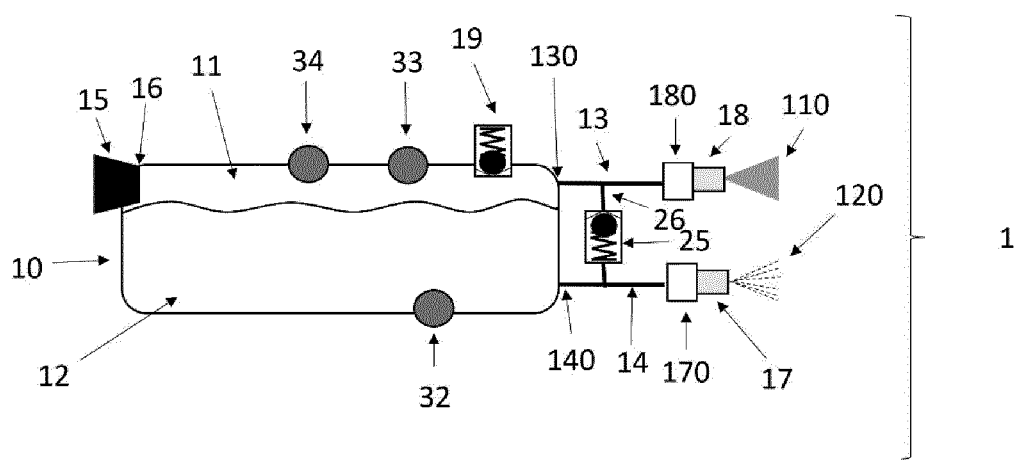
FIG. 11 is a vertical cross-section of an eighth embodiment of a cleaning device on-board of a vehicle according to the invention.

FIG. 11 presents a vertical cross-section of an eighth embodiment of a cleaning device 1 on-board of a vehicle according to the invention. Said eighth embodiment is an evolution of the first embodiment presented on FIG. 1, wherein the tank 10 further comprises several sensors such as a level sensor 32, a pressure sensor 33 and a temperature sensor 34.

Figure 12:
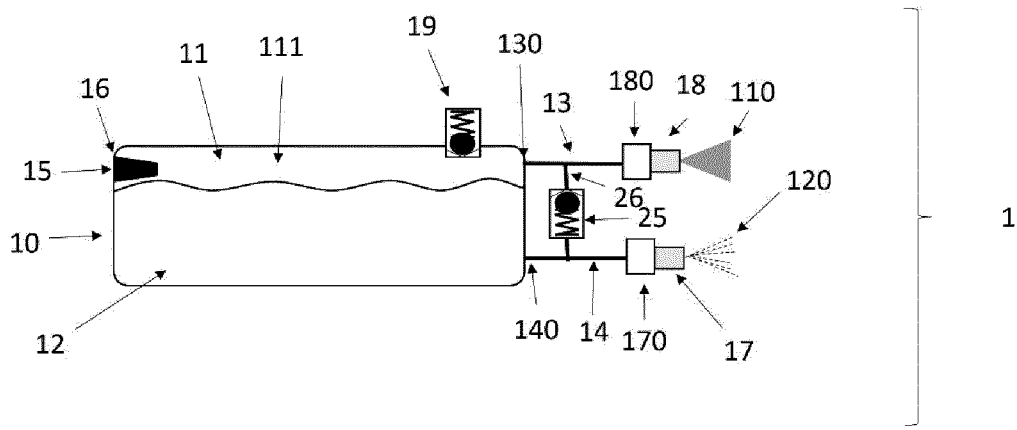
FIG. 12 is a vertical cross-section of a ninth embodiment of a cleaning device on-board of a vehicle according to the invention.

FIG. 12 presents a vertical cross-section of a ninth embodiment of a cleaning device 1 on-board of a vehicle according to the invention. Said ninth embodiment is an evolution of the first embodiment presented on FIG. 1, wherein the gas pressurizing means 15 is located totally in the gas volume 111 of the tank 10.

The embodiments of the cleaning device 1 on-board of a vehicle presented here above permit to perform a method for cleaning a surface of the vehicle, comprising the following steps:
  pressurizing a tank 10 containing a gas 11 and a washing liquid 12 by compressing said gas 11 with a gas pressurizing means 15,
  opening a first valve 170 located on a washing liquid feed line 14 fluidly connected to the tank 10 or opening a second valve 180 located on a gas feed line 13 fluidly connected to the tank 10,
  spraying the washing liquid 12 on the surface through a first nozzle 17 or blowing the gas 11 via a second nozzle 18 onto the surface.

A single step of blowing a gas 11 permits for example to dry the surface during or after a rain period or to avoid foreign matters, such as flying insects.

The embodiments of the cleaning device 1 on-board of a vehicle presented here above further permit to perform a method for washing a surface of a vehicle comprises the following successive steps:
  pressurizing a tank 10 containing a gas 11 and a washing liquid 12 by compressing said gas 11 with a gas pressurizing means 15,
  opening a first valve 170 located on a washing liquid feed line 14 fluidly connected to the tank 10,
  spraying the washing liquid 12 on the surface through a first nozzle 17,
  opening a second valve 180 located on a gas feed line 13 fluidly connected to the tank 10,
  blowing the gas 11 onto the surface through the second nozzle 18.

LIST OF REFERENCES

1: cleaning device
10: tank
11: gas
12: washing liquid
13: gas feed line
14: washing liquid feed line
15: gas pressurizing means
16: gas filling opening
17: first nozzle
18: second nozzle
19: overpressure valve
21: liquid gas separator
22: secondary circuit
23: overpressure relief valve
24: check valve
25: valve
26: line
27: hydraulic cylinder
32: level sensor
33: pressure sensor
34: temperature sensor
100: mounting flange
110: blown gas
111: gas volume
120: sprayed washing liquid
130: gas outlet port
140: washing liquid outlet port
170: first valve
180: second valve

The invention claimed is:

1. A cleaning device on-board of a vehicle, the cleaning device being configured for cleaning a surface of the vehicle, said cleaning device comprising:
  a tank configured for containing a gas and a washing liquid, the tank comprising a gas feed line, a washing liquid feed line, a washing liquid filling opening and a gas filling opening, a gas outlet port and a washing liquid outlet port,
  a gas pressurizing means fluidly connected to the gas filling opening and configured to pressurize the tank,
  a first nozzle configured to spray the washing liquid and/or to blow the gas, the first nozzle being fluidly connected to the gas feed line and/or the washing liquid feed line, and
  a first valve fluidly connected to the first nozzle,
  wherein the gas pressurizing means is located totally in a gas volume of the tank.

2. The cleaning device on-board of a vehicle according to claim 1, wherein the tank comprises an overpressure valve.

3. The cleaning device on-board of a vehicle according to claim 1, wherein the gas pressurizing means is affixed on a wall of the tank.

4. The cleaning device on-board of a vehicle according to claim 1, wherein the gas pressurizing means is selected from the group consisting of a compressor and a gas pump.

5. The cleaning device on-board of a vehicle according to claim 1, wherein said cleaning device comprises a second nozzle configured to spray the washing liquid and/or to blow the gas and said second nozzle is fluidly connected to the gas feed line and/or to the washing liquid feed line and to a second valve.

6. The cleaning device on-board of a vehicle according to claim 1, wherein said first nozzle is configured to spray an aerosol comprising the washing liquid and the gas or to spray the washing liquid or to blow the gas and the first nozzle being fluidly connected to the gas feed line and to the washing liquid feed line.

7. The cleaning device on-board of a vehicle according to claim 1, wherein the tank comprises a liquid gas separator located in the gas volume upstream of the gas outlet port.

8. The cleaning device on-board of a vehicle according to claim 1, wherein the first valve is a solenoid-actuated valve.

9. The cleaning device on-board of a vehicle according to claim 5, wherein the second valve is a solenoid-actuated valve.

10. The cleaning device on-board of a vehicle according to claim 1, wherein the tank comprises at least one sensor device selected from the group consisting of a level sensor, a pressure sensor, a temperature sensor and a combination thereof.

11. The cleaning device on-board of a vehicle according to claim 1, wherein a valve is located on a line connecting the gas feed line to the washing liquid feed line.

12. A vehicle comprising a cleaning device according to claim 1, said cleaning device being configured for cleaning a surface of said vehicle.

13. The vehicle according to claim 12, wherein the surface of the vehicle is a sensor surface or a camera surface.

14. A method for cleaning a surface of a vehicle comprising:
pressurizing a tank containing a gas and a washing liquid by compressing said gas using pressuring means located totally in a gas volume of the tank,
opening a first valve located on a washing liquid feed line fluidly connected to the tank or opening a second valve located on a gas feed line fluidly connected to the tank, and
spraying the washing liquid on the surface or blowing the gas onto the surface.

15. A method for washing a surface of a vehicle comprising:
pressurizing a tank containing a gas and a washing liquid by compressing said gas using pressuring means located totally in a gas volume of the tank,
opening a first valve located on a washing liquid feed line fluidly connected to the tank,
spraying the washing liquid on the surface,
opening a second valve located on a gas feed line fluidly connected to the tank, and
blowing the gas onto the surface.

* * * * *